Oct. 7, 1924.
O. H. PERRY
ALIGNING DEVICE FOR TRACTOR STEERING MECHANISMS
Filed Dec. 26, 1923
1,510,957
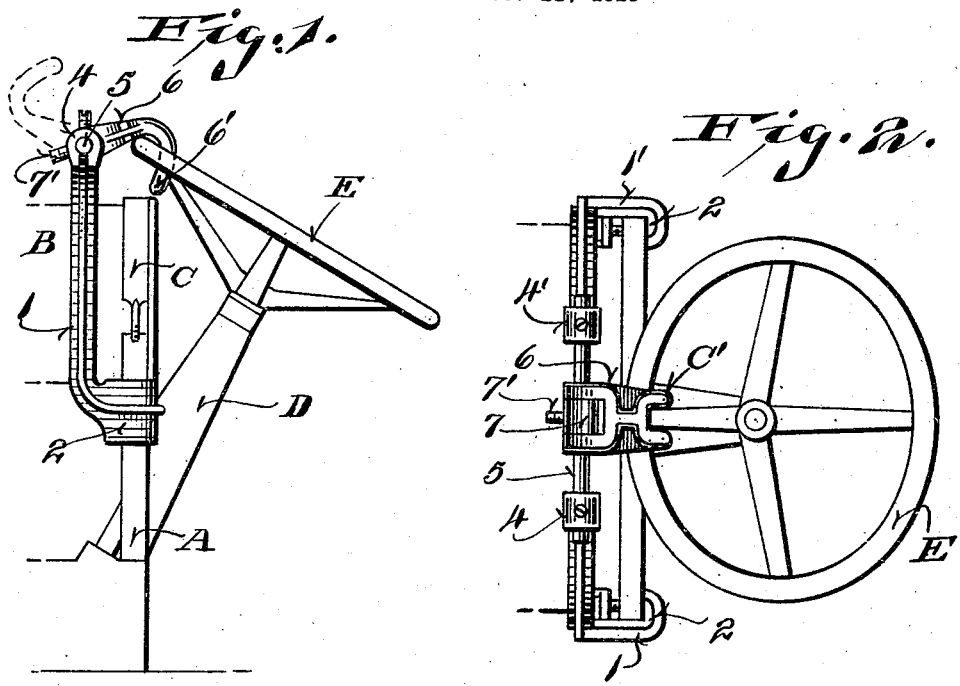
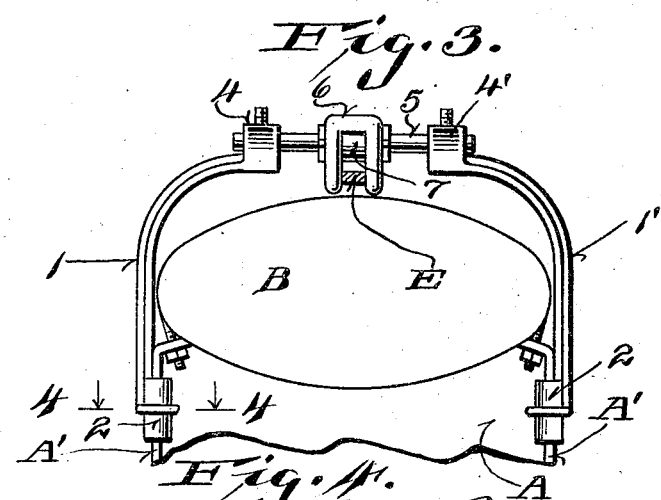

Patented Oct. 7, 1924.

1,510,957

UNITED STATES PATENT OFFICE.

ORLANDO H. PERRY, OF FORT ATKINSON, WISCONSIN.

ALIGNING DEVICE FOR TRACTOR STEERING MECHANISMS.

Application filed December 26, 1923. Serial No. 682,679.

*To all whom it may concern:*

Be it known that I, ORLANDO H. PERRY, a citizen of the United States, and resident of Fort Atkinson, in the county of Jefferson and State of Wisconsin, have invented certain new and useful Improvements in Aligning Devices for Tractor Steering Mechanisms; and I do hereby declare that the following is a full, clear, and exact description thereof.

My invention has for its primary object to provide a manually controlled means for aligning the steering device of a tractor, whereby the tractor will travel in a straight line when it is used as a motive power for plowing, or the like, the device being under manual control of the driver, whereby it can be positioned to lock the steering mechanism and release it when it is desired to turn the tractor at the end of a row. Obviously, the device may also be used on road travel under certain conditions.

The specific object of my invention is to provide an attachment for a tractor under manual control which is positioned in juxtaposition to the periphery of the steering wheel of the tractor mechanism, whereby the same can be locked in a predetermined position to cause the vehicle to travel in a straight line.

Another object of my invention is to provide an attachment of the above character, so arranged that it can be fitted to the dash of a tractor-frame without the use of tools, and positioned in juxtaposition to the periphery of the tractor steering wheel for manual manipulation.

With the above and other objects in view, the invention consists in certain peculiarities of construction and combination of parts, as will be hereinafter fully set forth with reference to the drawings and subsequently claimed.

I am aware that various devices have been provided for permanently locking the steering wheel of vehicles under the control of a key. Such devices, however, are attached to the steering post and consequently are positioned close to the axis of the steering wheel. These locking devices, clamped or otherwise secured to the steering post, are readily subjected to twisting strain, due to their position, and furthermore they are locking mechanisms per se and are not applicable to the object of my present invention.

In solving the problem of temporarily locking the steering mechanism of a tractor, to cause the tractor to run in a straight line when operating, the main difficulty was found due to the fact that a great strain was put upon the steering mechanism, whereby it would tend to wabble in the rough ground, and, therefore, any mechanism, for temporarily holding the steering mechanism in a straight line, must be designed to overcome the twisting strains of the steering wheel, and in my exemplification of the invention I have overcome the above referred to difficulty by rigidly sustaining a manually controlled tumbler just beyond the periphery of the steering wheel, whereby, when said tumbler is brought into locking engagement with the steering wheel, the strain of twisting motion is reduced to a minimum as such strain is located at the periphery of the wheel.

The other problem, in developing this invention, was to provide a means for attaching the aligning or locking tumbler to a standard tractor in such manner that any one unskilled in the art of mechanics could fasten the device to the tractor without drilling or the aid of tools.

In the drawings:—

Figure 1 represents a side elevation of a steering mechanism aligning device, embodying the features of my invention.

Figure 2, a plan view of the same.

Figure 3, a face view, and

Figure 4, an enlarged detailed, sectional view showing a means for attaching the device to a standard tractor.

Obviously, while I have shown the device as applicable as to what is known as the Fordson tractor, said device may be used in connection with various standard tractors without departing from the spirit of my invention.

Referring by characters to the drawings A represents the dash-frame of a standard tractor, B the oil tank, and C the retaining strap for the oil tank, which strap is suitably connected to the dash-frame. A steering post D extends obliquely from the face of the dash-frame and carries the standard spoked steering wheel E.

Secured to the flanged edges A′ of the dash-frame are arms 1 and 1′ respectively. The lower ends of the arms are provided with hooks 2 for engagement with the flanged edge of the dash-frame, and said hooks are held firmly in their engaged position by set screws 3, which set screws pass through lugs 3′ of the arms and oppose the inner walls of the dash-frame, whereby said arms are held rigidly and in alinement upon opposite sides of said dash frame.

The upper end of the arms terminate with apertured bosses 4—4′ for the reception of a stud 5 which is secured to the bosses by suitable set screws, as shown. Pivotally mounted upon the stud 5 is a lock and release tumbler 6, which tumbler is held against lateral play upon the stud by a thimble 7 which is rigidly secured to the stud by means of a set screw 7′. The pivotal base of the tumbler is spaced to form ears spanning the sleeve, as best shown in Figure 2, and the outer end of the tumbler terminates in a downturned forked hook 6′, the tines of which are adapted to straddle one of the spokes of the steering wheel when said spoke is brought to longitudinal, central alinement with reference to the tractor.

From the foregoing description it will be seen that the arms and connected stud, which is detachably secured to the dash-frame, is in the nature of a bracket and that the stud portion of said bracket is in approximate horizontal alinement with the juxtaposed peripheral edge of the tractor steering wheel E. Owing to the relative position of these parts the tumbler can be manually shifted by the driver of the tractor without releasing the steering wheel when it is desired to turn the vehicle, and for temporarily locking the steering wheel and its associated steering mechanism, when it is desired to cause the tractor to travel in a straight line, whereby strain of the driver in holding the steering mechanism steadily will be eliminated. Thus a great saving of energy is effected and the machine, at the same time, is assured of traveling in a straight line, which is particularly desirable in plowing. It will also be observed that when the tumbler is swung to its functioning engagement it will grip the periphery of the steering wheel and straddle one of its spokes. Thus the tendency of the steering wheel to oscillate under ground strain conditions will be avoided, and owing to the peripheral engagement of the tumbler and its position of anchorage to the frame of the tractor, the twisting strain upon the tumbler will be reduced to a minimum.

While I have shown and described one simple exemplification of my invention, it is manifest that I may vary the structural features of it within the scope of the claim.

I claim:—

In a tractor having a dash-frame, a steering mechanism and a spoked steering wheel for controlling the steering; the combination of a steering alinement attachment comprising a bracket, means for securing the bracket to the dash-frame, the said bracket being provided with a stud positioned in juxtaposition to the steering wheel and approximately upon a common plane with one edge of the same, and a forked tumbler pivotally mounted upon the stud, the forks of the tumbler being adapted to selectively engage one of the spokes of the steering wheel, whereby the same is held against movement at its periphery.

In testimony that I claim the foregoing, I have hereunto set my hand at Milwaukee, in the county of Milwaukee and State of Wisconsin.

ORLANDO H. PERRY.